(12) United States Patent
Eilerts et al.

(10) Patent No.: US 6,583,235 B1
(45) Date of Patent: Jun. 24, 2003

(54) EFFECT OF ALUMINOPHOSPHATE ON CATALYST SYSTEMS COMPRISING METAL ALKYL COCATALYSTS

(75) Inventors: Nancy W. Eilerts, Bartlesville, OK (US); Max P. McDaniel, Bartlesville, OK (US); Lloyd W. Guatney, Bartlesville, OK (US); Kathy S. Collins, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/474,320

(22) Filed: Dec. 29, 1999

(51) Int. Cl.$^7$ ................ C08F 4/44; C08F 2/00
(52) U.S. Cl. .......... 526/89; 526/156; 526/172; 502/155; 502/167
(58) Field of Search ............... 502/155, 162, 502/167, 168, 172; 526/172, 154, 156, 89

(56) References Cited

U.S. PATENT DOCUMENTS

| | | | |
|---|---|---|---|
| 5,714,556 A | | 2/1998 | Johnson et al. ............. 526/135 |
| 6,197,714 B1 | * | 3/2001 | Bansleben et al. .......... 502/155 |
| 6,130,167 A1 | * | 10/2001 | Kanzawa et al. ........... 526/352 |

FOREIGN PATENT DOCUMENTS

| | | | |
|---|---|---|---|
| WO | WO 96/23010 A2 | 8/1996 | ......... C08F/210/16 |

* cited by examiner

Primary Examiner—David W. Wu
Assistant Examiner—R. Harlan
(74) Attorney, Agent, or Firm—Kilpatrick Stockton LLP

(57) ABSTRACT

Novel catalyst systems which comprise one or more diimine nickel (II) or palladium (II) complexes, one or more cocatalysts, and aluminophosphate are disclosed. Olefin polymerization processes using those catalyst systems are also disclosed. The inclusion of aluminophosphate can improve the activity or productivity of such catalyst systems, making such catalyst systems active or more active in olefin polymerization under conditions in which they had previously been inactive or insufficiently active.

12 Claims, No Drawings

EFFECT OF ALUMINOPHOSPHATE ON CATALYST SYSTEMS COMPRISING METAL ALKYL COCATALYSTS

This invention relates to the use of aluminophosphate in catalyst systems comprising nickel and palladium catalysts and metal alkyl cocatalysts. This invention also relates to olefin polymerization processes using such catalyst systems to polymerize mono-1-olefins and optionally one or more co-monomers. The present invention also relates to polymers made by such processes.

BACKGROUND

It is well known that mono-1-olefins, such as ethylene and propylene, can be polymerized with catalyst systems employing transition metals such as titanium, vanadium, chromium, nickel and/or other metals, either unsupported or on a support such as alumina, silica, titania, and other refractory metals. Supported polymerization catalyst systems frequently are used with a cocatalyst, such as alkyl boron compounds and/or alkyl aluminum compounds and/or alkyl aluminoxy compounds. Organometallic catalyst systems, i.e., Ziegler-Natta-type catalyst systems, usually are unsupported and frequently are used with a cocatalyst, such as methylaluminoxane. Other components may be used in addition to the catalyst and cocatalyst.

It is also well known that, while no polymer production process is easy, slurry, or loop, polymerization processes are more commercially desirable than other polymerization processes, due to ease of operation. Furthermore, the type of polymerization process used can have an effect on the resultant polymer. For example, higher reactor temperatures can result in low catalyst activity and productivity, as well as a lower molecular weight polymer product. Higher reactor pressures also can decrease the amount of desirable branching in the resultant polymer.

Most polymer products made using slurry processes, especially polymer products made using supported chromium catalyst systems, have a broader molecular weight distribution and, therefore, the polymer product is much easier to process into a final product. Polymers made by other processes, such as, for example, higher temperature and/or higher pressure solution processes, can produce polymers having a narrow molecular weight distribution; these polymers can be much more difficult to process into an article of manufacture.

Unfortunately, many homogeneous organometallic catalyst systems have low activity, high consumption of very costly cocatalysts like methylaluminoxane (MAO), and can produce low molecular weight polymers with a narrow molecular weight distribution. Furthermore, even though MAO can be helpful or even necessary to produce a polymer with desired characteristics, an excess of MAO can result in decreased catalyst system activity. Additionally, these types of homogeneous catalyst systems preferably are used only in solution or gas phase polymerization processes.

U.S. Pat. No. 5,648,439 discloses aluminophosphate as the presently most preferred catalyst support for the chromium catalyst systems disclosed therein. The patent does not disclose that aluminophosphate can be employed in catalyst systems comprising other catalytic metals.

Polymerization processes for olefins using catalyst systems containing a nickel or palladium alpha-diimine complex, a metal containing hydrocarbylation compound, and a selected Lewis acid are disclosed in U.S. Pat. No. 5,852,145, the disclosure of which is incorporated herein by reference. In the '145 patent, the metal containing hydrocarbylation compound is defined as a compound that can transfer a hydrocarbyl group to a nickel or palladium compound. The patent states that useful alkylating agents (which are a form of the metal containing hydrocarbylation compound) have the formulas $MX_2R_n^6$ or $[Al(O)R^{11}]_q$, which includes alkylaluminum and alkylzinc compounds which may or may not have halogen groups as well as alkyl aluminoxanes. In that patent, the selected Lewis acids are referred to as compound (II), and the group consisting of $B(C_6F_5)_3$, $AlCl_3$, $AlBr_3$, $Al(OTf)_3$ and $(R^{13}R^{14}R^{15}C)Y$ is particularly disclosed and claimed. The patent states that when a hydrocarbylation compound is other than an alkylaluminum compound containing one or more halogen atoms bound to an aluminum atom or an alkyl aluminoxane, compound (II) must be present. Thus, when the hydrocarbylation compound is $R_3Al$, compound (II) must be present.

U.S. Pat. No. 5,852,145 does not disclose or suggest aluminophosphate as a suitable compound (II) or a catalyst system that includes aluminophosphate. The patent states that compound (II) may optionally be present when the hydrocarbylation compound is $R_2AlBr$, $RAlC_2$, or "RAlO". The patent does not indicate whether including compound (II) with those hydrocarbylation compounds will improve or alter the activity or productivity of the catalyst system.

SUMMARY OF THE INVENTION

It is an object of this invention to provide novel catalyst systems useful for polymerization.

It is another object of this invention to provide catalyst systems which are relatively simple to make, have increased activity and increased productivity.

It is a further object of this invention to provide catalyst systems which employ less costly cocatalysts.

It is an object of this invention to provide a catalyst system comprising at least diimine one nickel (II) or palladium (II) complex, at least one cocatalyst and aluminophosphate. Processes for making and using such catalyst systems are also provided.

It is also an object of this invention to provide an olefin polymerization process comprising contacting in a reaction zone under polymerization conditions an olefin monomer and a catalyst system comprising at least one diimine nickel (II) or palladium (II) complex, at least one cocatalyst and aluminophosphate.

It is further an object of this invention to provide an active olefin polymerization catalyst system comprising at least one diimine nickel (II) or palladium (II) complex, at least one cocatalyst, and an amount of aluminophosphate, where the catalyst system would not be active in the absence of aluminophosphate.

It is also an object of this invention to provide a method of making a catalyst system active or more active in the polymerization of olefins by adding an effective amount of aluminophosphate.

It is a further object of this invention to provide a process for making polyolefins employing diimine nickel or palladium catalyst systems that heretofore have been considered inactive or insufficiently active in olefins polymerization.

In accordance with this invention, catalyst systems comprising one or more nickel or palladium catalysts, at least one cocatalyst and an effective amount of aluminophosphate are provided. The nickel catalysts can be diimine nickel complexes can further comprise additional ligands selected from the group consisting of α-deprotonated-β-diketones, α-deprotonated-β-ketoesters, halogens and mixtures thereof. In presently preferred embodiments, the catalyst systems comprise diimine nickel complexes having a formula selected from the group consisting of Ni(NCR'C$_6$R$_2$H$_3$)$_2$(Y$_2$C$_3$R"$_2$X)$_2$ and Ni(NCR'C$_6$R$_2$H$_3$)$_2$(Y$_2$C$_3$R"$_2$X)Z, and Ni(NCR'C$_6$R$_2$H$_3$)$_2$(Y$_2$C$_3$R"$_2$X)$_2$, and the cocatalyst may be an alkyl aluminum compound or an alkyl zinc compound. Processes to make these catalyst systems also are provided.

In accordance with another embodiment of this invention, slurry polymerization processes comprising contacting ethylene, and optionally one or more higher alpha-olefins, in a reaction zone with heterogeneous catalyst systems comprising one or more nickel or palladium catalysts, at least one cocatalyst and aluminophosphate are provided. The catalyst systems preferably comprise diimine nickel complexes that may further comprise additional ligands selected from the group consisting of α-deprotonated-β-diketones, α-deprotonated-β-ketoesters, halogens and mixtures thereof.

In accordance with this invention, heterogeneous catalyst systems consisting essentially of at least one diimine nickel complex, at least one cocatalyst, and aluminophosphate are provided. The diimine nickel complexes may further comprise additional ligands selected from the group consisting of α-deprotonated-β-diketones, α-deprotonated-β-ketoesters, halogens and mixtures thereof. The cocatalyst can be an alkylaluminum compound or an alkylzinc compound. Processes for making and using these catalyst systems also are provided.

DESCRIPTION OF THE PREFERRED EMBODIMENTS

Catalyst Systems

Catalyst systems of the present invention can be characterized as comprising one or more nickel or palladium catalysts, at least one cocatalyst, and an effective amount of aluminophosphate, wherein the amount of aluminophosphate is sufficient to make the catalyst systems active for olefin polymerization, or to improve the activity of the catalyst systems for olefins polymerization, or to alter the nature of the polymer made in an olefin polymerization process using those catalyst systems. The nickel and palladium catalysts are preferably diimine complexes that typically comprise additional ligands selected from the group consisting of α-deprotonated-β-diketones, α-deprotonated-β-ketoesters, halogens and mixtures thereof. Most preferably, the catalyst systems comprise at least one diimine nickel complex having a formula selected from the group consisting of Ni(NCR'C$_6$R$_2$H$_3$)$_2$(Y$_2$C$_3$R"$_2$X)$_2$ and Ni(NCR'C$_6$R$_2$H$_3$)$_2$(Y$_2$C$_3$R"$_2$X)Z and Ni(NCR$^1$C$_6$R$_2$H$_3$)$_2$Z$_2$. Alternatively, the nickel complexes can be selected from the group having one of the formulas shown below in Compounds I and II,

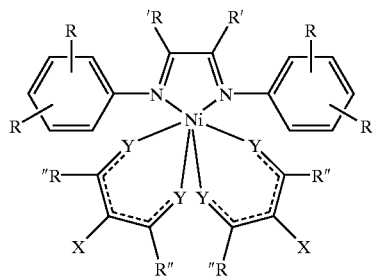

Compound I

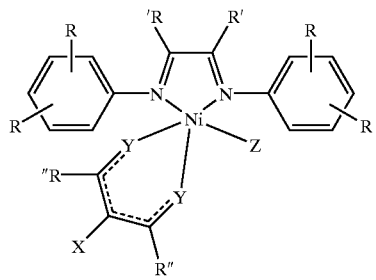

Compound II wherein each R is independently selected from the group consisting of hydrogen and alkyl or aromatic groups having from about 1 to about 10, preferably from about 1 to about 8, carbon atoms per alkyl group, wherein said alkyl groups may be branched or linear and the R substituents on the aromatic ring may be the same or different, and the R substituents can be in any position on the aromatic ring; and wherein each R' is independently selected from the group consisting of hydrogen and linear, branched, cyclic, bridging, aromatic, and/or aliphatic hydrocarbons, having from about 1 to about 70, preferably from about 1 to about 20, carbon atoms per radical group and wherein the R' substituents on the aromatic ring can be the same or different.

The R substituents on the aromatic rings of the diimine nickel complex in Compounds I and II can be the same or different, and they are independently selected from the group consisting of branched or linear alkyl (aliphatic) or aromatic groups having from about 1 to about 10, preferably from about 1 to about 8, carbon atoms per alkyl group. Although hydrogen can be used, hydrogen can inhibit synthesis of the ligand. R substituents having more than about 8 carbon atoms per group can result in a catalyst system with lower activity and/or productivity. Similarly, having more than two R substituents on the aromatic ring can result in a catalyst system with lower activity and/or productivity. While not wishing to be bound by theory, it is believed that larger or more substituent groups can cause steric hindrance in the catalyst system, which can thereby decrease catalyst system activity and/or productivity and/or ease of synthesis of the catalyst. Nonetheless, under some circumstances, having larger or more R substituents may provide advantages that compensate for lower activity and/or productivity. Thus, having larger or more substituents is not excluded. Exemplary alkyl substituents are selected from the group consisting of methyl, ethyl, propyl, isopropyl, butyl, isobutyl, tert-butyl, benzyl, phenyl groups, and mixtures of two or more thereof. Preferably, the R substituent is an electrondonating species, selected from the group consisting of linear or branched aliphatic groups having from about 1 to about 5 carbon atoms per group. Most preferably, the R substituents are both the same and are selected from the substituents consisting of methyl and isopropyl, due to commercial availability and ease of synthesis of the ligand.

The R substituent can be in any position on the aromatic ring, i.e., from the 2 to 6 position. Preferably, the R substituent is either in the 2 or 6 position, due to ease of synthesis. Where there are two R substituents, they may be the same or different, and it is preferred that they are the same and in the 2 and 6 positions, for best catalytic activity and productivity.

The R' substituents can be the same or different and are independently selected from the group consisting of hydrogen and branched, linear, cyclic, aromatic or aliphatic radicals having from about 1 to about 70 carbon atoms per radical. Further, the R' substituents can be linked, or joined, across the carbon-carbon bridge between the two nitrogen atoms. While not wishing to be bound by theory, it is believed that radicals having more than 70 carbon atoms can add to the steric hindrance of the catalyst systems and hinder catalyst synthesis and/or activity and productivity. Preferably, the R' substituent is selected from the group consisting of hydrogen and branched, linear, cyclic, aromatic or aliphatic radicals having from about 1 to about 20 carbon atoms per radical, due to commercial availability and ease of synthesis of the ligand. Most preferably, the R' substituents are the same or form a link in addition to the carbon-carbon bridge between the nitrogen atoms. Also, the R' substituent is selected from the group consisting of hydrogen and branched, linear, cyclic, aromatic or aliphatic radicals having from about 1 to about 12 carbon atoms per radical, for the reasons given above. Exemplary R' substituents include, but are not limited to, hydrogen, methyl, ethyl, propyl, phenyl, or when the R' substituents are linked, they preferably form acenaphthyl or cyclobutadienyl. Preferably, the R' substituents are identical and are selected from the group consisting of hydrogen, methyl and acenaphthyl for best resultant catalyst system activity and productivity.

In the formulas and compounds above, the R"CYCXCYR" substituents or ligands (also written as $Y_2C_3R''_2X$) on the diimine complex can be the same or different and are selected from the group consisting of α-deprotonated-β-diketones, α-deprotonated-β-ketoesters, halogens and mixtures thereof The R" substituents can be the same or different. The α-deprotonated-β-diketones and α-deprotonated-β-ketoesters can be derived from β-diketone and β-ketoester ligand precursors. Exemplary ligand precursors include, but are not limited to, compounds selected from the group consisting of 2,4-pentanedione, 1,1,1,5,5,5-hexafluoro-2,4-pentanedione, allylacetonacetate, benzoylacetonate, benzoyl-1,1,1-trifluoroacetone, 1,1,1-trifluoro-2,4-pentanedione, 1-chloro-1,1-difluoroacetylacetone methyl-4,4,4-trifluoroacetoacetate, 1,1,1-trifluoro-5,5-dimethyl-2,4-pentanedione, ethyl α-methyl-4,4,4-trifluoroacetoacetate, 4,4,4-trifluoro-1-(2-furyl)-1,3-butanedione, and 2,2-dimethyl-6,6,7,7,8,8,8-heptafluoro-3,5-octanedione. Preferably, ligand precursors are selected from the group consisting of 2,4-pentanedione, 1,1,1,5,5,5-hexafluoro-2,4-pentanedione, 1,1,1-trifluoro-2,4-pentanedione, 1-chloro-1,1-difluoroacetylacetone, methyltrifluoroacetoacetate, 1,1,1-trifluoro-5,5-dimethyl-2,4-pentanedione, and ethyl α-methyl-4,4,4-trifluoroacetoacetate. Most preferably, ligands include, but are not limited to 2,4-pentanedione, 1,1,1,5,5,5-hexafluoro-2,4-pentanedione, 1,1,1-trifluoro-2,4-pentanedione, 1-chloro-1,1-difluoroacetylacetone, and 1,1,1-trifluoro-5,5-dimethyl-2,4-pentanedione for best catalyst system activity as well as best polymer product properties.

Group Z, which is a halogen, of the diimine complex is selected from the group consisting of fluorine, chlorine, bromine and/or iodine. Preferably, the halogen is selected from the group consisting of chlorine and/or bromine for high catalyst activity and productivity. Most preferably, the halogen is chlorine for best catalyst system activity and productivity.

The catalyst systems can comprise more than one diimine complex. Contemplated for use in this invention, a catalyst system comprising two or more diimine nickel or palladium complexes may be employed in a polymerization process to produce a polymer having a multimodal molecular weight distribution.

The diimine metal complexes disclosed herein can be prepared according to any method known in the art. For example, approximate molar equivalents of a diimine ligand and a nickel or palladium compound can be contacted in the presence of any compound that can dissolve both the diimine ligand and metal compound, either partially or completely. The contacting conditions can be any conditions suitable to effect the formation of a diimine nickel or palladium complex. Preferably, for best product results, the diimine ligand/metal complex mixture is contacted at room temperature under a dry atmosphere for any amount of time sufficient to form the diimine metal complex. Completion of the formation of the diimine metal complex can be evidenced by a color change. Generally, contacting times of at least about 8 hours, and preferably at least about 12 hours are sufficient. Usually, as a result of the preparation procedure, the resultant diimine metal complex will comprise from about 3 to about 20, preferably from about 5 to about 15, weight percent nickel, based on the total mass of the diimine metal complex. The presence of oxygen is not thought to be detrimental to this aspect of the preparation procedure.

In general, diimine ligands are contacted with a nickel β-diketonate or nickel β-diketonate halide to form diimine nickel complexes. Typical syntheses of nickel complexes related to those described in this invention can be found in Dieck, H., Svboda, M., and Greiser, T., Z. Naturforsch B: Anorg. Chem. Organ. Chem., Vol. 36b, pp. 823–832 (1981), herein incorporated by reference. Usually, for ease of catalyst system preparation, the diimine ligand is prepared first. The catalyst preparation procedure can vary, depending on the substituents on the diimine ligand. For example, to prepare a specific diimine ligand, wherein R' is hydrogen, a three component mixture is prepared. A two-fold molar excess of aniline, containing the desired R substituents ($R_nC_6H_{(7-n)}N$, wherein n=1 or 2), is contacted with a dialdehyde, such as, for example, glyoxal (CHOCHO), in the presence of a compound capable of being a solvent for both organic and aqueous compounds. Exemplary solvents for both organic and aqueous compounds include, but are not limited to, methanol, ethanol and/or tetrahydrofuran (THF). The mixture can be contacted, preferably refluxed, under any atmosphere to form the desired ligand. Preferably, the mixture is refluxed for at least 10, preferably 20 minutes, cooled and the desired ligand can be recovered. Generally, after refluxing and cooling, the ligand can be recovered in a crystalline form.

To prepare another specific diimine ligand wherein the R' group is anything other than hydrogen, a similar procedure can be used. For example, at least a two-fold molar excess of aniline or a substituted aniline can be combined with a compound capable of dissolving both organic and aqueous compounds and a very minor amount of formic acid. Then, about a one molar equivalent of an alpha-diketone (R'COCOR') can be added to the mixture. The mixture can be stirred, under atmospheric conditions of temperature and pressure until the reaction is complete and the desired ligand is formed. Preferably, water is absent from the reaction mixture. Generally, the reaction can be completed in about 18, preferably 24 hours. A crystalline ligand product can be recovered according to any method known in the art.

The nickel bis($\beta$-diketonate), nickel bis($\beta$-ketoester), nickel $\beta$-diketonate halide and nickel $\beta$-ketoester halide can be prepared by any method known in the art. Typical syntheses of such nickel complexes can be found in Bullen, G. J., Mason, R., and Pauling, P., *Inorganic Chemistry*, Vol. 4, pp. 456–462 (1965), herein incorporated by reference. Alternatively, and especially in the case of nickel $\beta$-diketonate halides and nickel $\beta$-ketoester halides, the salt of the $\beta$-diketone or $\beta$-ketoester can be prepared then reacted with the correct quantity of nickel halide. A mixture of an appropriate Brönsted base, such as but not limited to sodium or potassium hydride or sodium or potassium methoxide, is mixed with a solvent capable of dissolving or becoming miscible with the $\beta$-diketone or $\beta$-ketoester. Exemplary solvents include toluene, benzene, methanol, or ethanol. One molar equivalent of the $\beta$-diketone or $\beta$-ketoester is added slowly to this mixture. Reaction is known to occur as evidenced by the evolution of heat and a change in the physical appearance of the mixture.

Once all reactants have contacted, reaction times from about 4 to about 12 hours are sufficient to ensure complete reaction. If the product salt of the $\beta$-diketone or $\beta$-ketoester is not soluble in the solvent chosen, the solvent is removed by filtration or vacuum and the salt dissolved in a solvent in which it is soluble. Exemplary solvents include, but are not limited to, methanol and ethanol. This solution then is added to a one half molar equivalent of nickel halide that has been suspended or dissolved in the same solvent or a solvent with which the first solvent is miscible. The preceding reactant ratio results in the formation of the nickel bis($\beta$-diketonate) or nickel bis($\beta$-ketoester). If the nickel $\beta$-diketonate halide or nickel $\beta$-ketoester halide are desired, the solution is added to one molar equivalent of nickel halide as described. Reaction is known to occur as evidenced by the formation of a soluble green species. Reaction times of from about 4 to about 12 hours are sufficient to ensure complete reaction. Byproduct sodium or potassium halide salt can be removed from the reaction product by filtration and/or centrifugation. The solvent can be removed by vacuum to yield the nickel complex used in the nickel diimine complex synthesis.

After formation of a diimine nickel complex, the diimine nickel complex can be recovered by any method known in the art, such as, for example evaporation and/or vacuum filtration of the solvent. If desired, the diimine nickel complex can be further purified by washing. One exemplary wash compound can be heptane. The diimine nickel complex catalyst system can be recovered and used as part of a system.

The catalyst systems of the present invention generally include one or more cocatalysts, although in some circumstances, the cocatalyst can be omitted or combined with another component of the catalyst system. Exemplary cocatalysts include, but are not limited to, metal alkyl cocatalysts such as alkyl boron compounds and/or alkyl aluminum compounds and/or alkyl aluminoxy compounds. Other examples of cocatalysts include alkyl zinc compounds. It is contemplated that in some embodiments, the cocatalyst can be aluminum compounds of the formula $AlR^2{}_nX_{3-n}$ or zinc compounds of the formula $ZnR^2{}_mX_{2-m}$, where X is a hydride or halide, $R^2$ is a hydrocarbyl radical having 1 to 12 carbon atoms, and the $R^2$ substituents can be the same or different, and n is an integer of 1 to 3, and m is an integer of 1 to 2. Trimethyl aluminum, diethyl zinc, diethyl aluminum chloride, and ethyl aluminum dichloride are non-limiting examples of suitable cocatalysts.

A cocatalyst, when used, can be used in any amount to improve catalyst system activity and productivity. Further, the amount of cocatalyst added to the reactor can vary. Generally, a molar excess of MAO is present, relative to the diimine nickel complex. Preferably, the metal in the cocatalyst to metal in the catalyst system (Ni or Pd) (cocatalyst metal:catalyst metal) molar ratio is less than about 1500:1, more preferably within a range of about 50:1 to about 600:1. Most preferably, the molar ratio of metal in the cocatalyst to metal in the catalyst system (Ni or Pd) is within a ratio of 100:1 to 400:1 for best catalyst system activity and productivity.

The cocatalyst either can be premixed with the diimine nickel complex(es) or added as a separate stream to the polymerization zone.

Catalyst systems of the present invention further comprise aluminophosphate, also referred to as $AlPO_4$. Aluminophosphate is disclosed in U.S. Pat. No. 4,364,855, the entirety of which is herein incorporated by reference. Generally, the P/Al molar ratio of the aluminophosphate is within a range of about 0.2 to about 1.0 and preferably within a range of about 0.4 to about 0.9. The aluminophosphate can be used as a support for the catalyst system or it can be included in addition to another catalyst support such as an inorganic oxide. Exemplary inorganic oxides include, but are not limited to, silica, silica-alumina, alumina, fluorided alumina, silated alumina, fluorided/silated alumina, thoria, aluminum phosphate, phosphated silica, phosphated alumina, silica-titania, coprecipitated silica/titania, and mixtures thereof.

The aluminophosphate can be activated prior to use or inclusion in the catalyst system. The aluminophosphate can be activated at a temperature within a range of about 200° C. to about 1000° C., preferably within the range of about 500° C. to about 800° C., most preferably at about 600° C. to about 700° C. for 3 to 4 hours.

The inclusion of aluminophosphate in certain catalyst systems comprising a nickel or palladium catalyst and a cocatalyst can improve the productivity of those catalyst systems. In some circumstances, catalyst systems that are not active or are insufficiently active in the polymerization of olefins can be made active or more active by the inclusion of aluminophosphate in the catalyst system.

The amount of aluminophosphate included in the catalyst system depends in part on the amounts and types of nickel complexes and cocatalysts employed. The determination of an effective amount of aluminophosphate for the desired purpose will not present difficulty in view of the present disclosure. It is contemplated that the preferred molar ratio of aluminum in $AlPO_4$ included in the catalyst system to metal in the catalyst can be within a range of from about 10:1 to about 100,000:1, preferably from about 50:1 to about 10,000:1. Most preferably the molar ratio of aluminum in $AlPO_4$ included in the catalyst system to metal in the catalyst is within a range of 100:1 to 5000:1.

It has been found by the present inventors that catalyst systems having a diimine nickel complex and a cocatalyst that is a trialkyl aluminum or a dialkyl zinc are not active as olefin polymerization catalyst systems. However, by including an effective amount of aluminophosphate in those catalyst systems, it has been found that those catalyst systems become active as olefins polymerization catalyst systems. It has been found that other catalyst systems having a diimine nickel complex and a cocatalyst that is an alkyl aluminum halide or an alkyl zinc halide are active as olefin polymerization catalyst systems; however, it has been found that the inclusion of aluminophosphate can increase the productivity of those catalyst systems or lower the density of polyethylene made using one such catalyst system.

Reactants, Polymerization and Polymer Products

Polymers produced according to the process of this invention can be homopolymers of mono-1-olefins or copolymers of at least two different mono-1-olefins. Exemplary mono-1-olefins useful in the practice of this invention include but are not limited to mono-1-olefins having from about 2 to about 10 carbon atoms per molecule. Preferred mono-1-olefins include, but are not limited to ethylene, propylene, 1-butene, 1-pentene, 1-hexene, 1-heptene, 3-methyl-1-butene, 4-methyl-1-pentene, 1-octene, 1-nonene and 1-decene. If the reaction product is a copolymer, one mono-1-olefin monomer can be polymerized with a mono-1-olefin comonomer which is a different alpha olefin, usually having from about 3 to about 10, preferably from 3 to 8 carbon. atoms per molecule. Exemplary comonomers include, but are not limited to, propylene, 1-butene, butadiene, 1-pentene, 1-hexene, 1-octene, 4-methyl-1-pentene, and mixtures thereof. Preferably, if the monomer is ethylene, the comonomer is 1-hexene and/or 4-methyl-1-pentene, in order to achieve maximum polymer product toughness. Preferably, if the monomer is propylene, the comonomer is ethylene and/or butadiene in order to achieve maximum polymer product toughness and clarity.

If a comonomer is used, the comonomer can be added to the polymerization reactor, or reaction zone, in an amount within a range of about 1 to about 20 weight percent, preferably within 7 to about 18 weight percent, based on the weight of the ethylene monomer. Most preferably, a comonomer is present in the reaction zone within a range of about 10 to about 16 weight percent, in order to produce a polymer having the most desired physical properties.

Polymerization of the monomer and optional comonomer may be carried out under slurry polymerization conditions, also known as loop/slurry or particle form polymerization conditions. Under such conditions, the temperature is kept below the temperature at which polymer swells significantly. Slurry polymerization processes are much easier to operate and maintain than other polymerization processes; a polymer product produced by a slurry process can be recovered much more easily. Such polymerization techniques are well-known in the art and are disclosed, for instance, in Norwood, U.S. Pat. No. 3,248,179, the disclosure of which is hereby incorporated by reference.

The slurry process generally is carried out in an inert diluent (medium), such as, for example, a paraffin, cycloparaffin, and/or aromatic hydrocarbon. Preferably, the inert diluent is an alkane having less that about 12 carbon atoms per molecule, for best reactor operation and polymer product. Exemplary diluents include, but are not limited to propane, n-butane, isobutane, n-pentane, 2-methylbutane (isopentane), and mixtures thereof. Isobutane is the most preferred diluent due to low cost and ease of use.

The temperature of the polymerization reactor, or reaction zone, when using isobutane as the reactor diluent, according to this invention, is critical and must be kept within a range of about 5° C. to about 100° C. (41° F.–212° F.) and preferably within a range of about 10° C. to about 70° C. (50° F. –158° F.). Most preferably, the reaction zone temperature is within a range of 20° C. to 60° F. (68° F.–140° C.) for best catalyst activity and productivity. Reaction temperatures below about 10° C. can be ineffective for polymerization.

Pressures in the slurry process can vary from about 100 to about 1000 psia (0.76–7.6 MPa), preferably from about 200 to about 700 psia. Most preferably, the reaction zone is maintained at a pressure within a range of 300 to 600 psia for best reactor operating parameters and best resultant polymer product. The catalyst system is kept in suspension and is contacted with the monomer and comonomer(s) at sufficient pressure to maintain the medium and at least a portion of the monomer and comonomer(s) in the liquid phase. The medium and temperature are thus selected such that the polymer or copolymer is produced as solid particles and is recovered in that form. Catalyst system concentrations in the reactor can be such that the catalyst system content ranges from 0.001 to about 1 weight percent based on the weight of the reactor contents.

The nickel or palladium catalyst, cocatalyst and aluminophosphate can be added to the reactor in any order to effect polymerization. For example, a diimine nickel complex can be added, then some reactor diluent, such as isobutane, followed by aluminophosphate, then by cocatalyst, then more diluent and finally, monomer and optional comonomer. Alternatively, a diimine nickel complex and aluminophosphate can be combined prior to addition to the reactor. However, as stated earlier, this addition order can be varied, depending on equipment availability and/or desired polymer product properties. Preferably, the catalyst system and cocatalyst are not precontacted prior to addition to the polymerization reactor due to a possible decrease in catalyst system activity.

The amounts of nickel or palladium catalyst system, cocatalyst, and aluminophosphate added to the reactor can vary. Generally, a molar excess of cocatalyst can be present, relative to the catalyst system. Preferably, the aluminum to nickel (Al:Ni) molar ratio or the zinc to nickel molar ratio (Zn:Ni) is less than about 1500:1, more preferably within a range of about 50:1 to about 600:1. Most preferably, the molar ratio of aluminum to nickel, or zinc to nickel, is within a ratio of 100:1 to 400:1 for best catalyst system activity and productivity. Similar molar ratios of Al:Pd and Zn:Pd can be used.

Two preferred polymerization methods for the slurry process are those employing a loop reactor of the type disclosed in Norwood and those utilizing a plurality of stirred reactors either in series, parallel or combinations thereof wherein the reaction conditions can be the same or different in the different reactors. For instance, in a series of reactors, a chromium catalyst system which has not been subjected to the reduction step can be utilized either before or after the reactor utilizing the catalyst system of this invention.

Polymers produced by using diimine nickel complexes generally have reduced cocatalyst consumption and tend to use cocatalysts, such as MAO, efficiently and productively.

Polymers produced by using single diimine nickel complexes generally have a relatively narrow heterogeneity index (HI), which is a ratio of the weight average molecular weight ($M_w$) and the number average molecular weight ($M_n$) also expressed as $M_w/M_n$. However, polymers produced by using a catalyst system comprising two different diimine nickel complexes usually can have a relatively wider heterogeneity index.

Polymers produced by using single diimine nickel complexes are very unique because of a significant amount of short chain branching which can be produced even in the absence of a comonomer added to the reactor. This short chain branching is evidence that some sort of comonomers are produced in-situ in the reactor and are incorporated into the polymer and/or that the catalyst can form short chain branches by rearrangement of the main polymer chain through successive hydride elimination, olefin rotation, and hydride re-addition reactions. This series of steps may or may not involve discrete intermediates and may rather be a concerted or continuous series of reactions with no distinct intermediates formed. Such rearrangements can be termed "chain walking". Chain walking can be described by the active metal catalyst, i.e. nickel, Awalking@ a distance along the polymer backbone during polymerization and hence, the short chain branch length can be dictated by the rate of ethylene insertion relative to the combined rates of hydride elimination, olefins rotation, and hydride re-addition. Usually, polymers produced in accordance with this invention, wherein no comonomer is added to the polymerization reactor, comprise up to about 3000, and generally from about 20 to about 3000 short chain branches per 10,000, or from about 2 to about 300 short chain branches per 1000, backbone carbon atoms of the polymer. Furthermore, the short chain branches produced comprise both odd and even carbon branches, i.e., branches comprising an odd number of carbon atoms per short chain branch, as well as branches comprising an even number of carbon atoms per short chain branch.

If desired, optional addition of one or more comonomers can be added to the polymerization reactor. The affirmatively added comonomers can further increase the amount of short chain branching in the resultant polymer, or copolymer. Polymers produced with the addition of a comonomer can have a greater number of short chain branches in addition to those generated as described above. If a comonomer is affirmatively added to the polymerization reactor, these polymers usually can comprise up to about 3500, and generally from about 20 to about 3500, short chain branches per 10,000 backbone carbon atoms of polymer.

A further understanding of the invention and its advantages is provided by the following examples.

EXAMPLES

The following Examples illustrate various aspects of the invention. Data about polymerization conditions and the nature of the resultant polymer are provided below. All chemical handling, including reactions, preparation and storage, was performed under a dry, inert atmosphere (usually nitrogen). Unless otherwise indicated, bench scale polymerizations were completed in a 2.6 liter autoclave reactor at the desired temperature using an isobutane (1.2 liter) slurry. The reactor was heated to 120° C. and purged with nitrogen for about 20 minutes. The reactor then was cooled to the desired polymerization temperature and pressurized with isobutane to about 400 psig. A known quantity (mass) of diimine nickel complex catalyst was charged to the reactor against a countercurrent of isobutane and the agitator was set at 490 rpm. If hydrogen was charged to the reactor, hydrogen addition was followed by isobutane. The indicated quantity of cocatalyst was charged directly to the reactor via syringe. After the full volume of isobutane was added, ethylene was added to bring the total reactor pressure to 550 psig. Ethylene was fed on demand and the polymerization reaction terminated when ethylene flow into the reactor ceased.

The diimine nickel complex used in each of the Runs was N,N'-bis(2,6-diisopropylphenyl)-2,3-butanediimine nickel (II) bis(1,1,1,5,5,5-hexafluoroacetylacetonate), which is abbreviated as

[(iPr$_2$Ph)$_2$DABMe$_2$]Ni(hfacac)$_2$, as depicted in the Figure below.

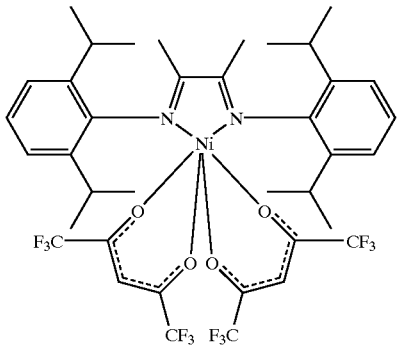

The aluminophosphate (AlPO$_4$) activator is described as having a phosphorous to aluminum molar ratio of 0.8. The aluminophosphate is calcined at 600–700° C. for 3.5 hr in air then cooled prior to addition to the polymerization reactor.

However, it is contemplated that other diimine nickel complex may be used, as well as other nickel and palladium catalysts. Illustrative examples of diimine nickel complexes (preceded by their abbreviations) that may be used in the present invention include, but are not limited to,

[(iPr$_2$Ph)$_2$DABMe$_2$]Ni(acac)$_2$-N,N'-bis(2,6-diisopropylphenyl)-2,3-butanediimine nickel(II) bis (acetylacetonate);

[(iPr$_2$Ph)$_2$DABMe$_2$]Ni(hfacac)Cl -N,N'-bis(2,6-diisopropylphenyl)-2,3-butanediimine nickel(II) (1,1,1 5,5,5-hexafluoroacetylacetonate)chloride;

[(iPr2Ph)$_2$DABMe$_2$]Ni(allOacac)$_2$-N,N'-bis(2,6-diisopropylphenyl)-2,3-butanediimine bis (allylacetylacetonato) nickel(II);

[(iPr$_2$Ph)$_2$DABMe$_2$]Ni(Phacac)$_2$-N,N'-bis(2,6-diisopropylphenyl)-2,3-butanediimine nickel(II) bis (benzoylacetonate);

[(iPr$_2$Ph)$_2$DABMe$_2$]Ni(PhCF$_3$acac)$_2$-N,N'-bis(2,6-diisopropylphenyl)-2,3-butanediimine nickel(II) bis (benzoyl-1,1,1-trifluoroacetonate);

[(iPr$_2$Ph)$_2$DABMe$_2$]Ni(CF$_3$acac)$_2$-N,N'-bis(2,6-diisopropylphenyl)-2,3-butanediimine nickel(II) bis(1, 1,1-trifluoroacetylacetonate);

[(iPr$_2$Ph)$_2$DABMe$_2$]Ni(CClF$_2$acac)$_2$-N,N'-bis(2,6-diisopropylphenyl)-2,3-butanediimine nickel(II) bis(1-chloro-1,1-difluoroacetylacetonate);

[(iPr$_2$Ph)$_2$DABMe$_2$]Ni(CF$_3$MeOacac)$_2$-N,N'-bis(2,6-diisopropylphenyl)-2,3-butanediimine bis (methyltrifluoroacetoacetonato) nickel(II);

[(iPr$_2$Ph)$_2$DABMe$_2$]Ni(CF$_3$tBuacac)$_2$-N,N'-bis(2,6-diisopropylphenyl)-2,3-butanediimine nickel(II) bis(1, 1,1-trifluoro-5,5-dimethylacetylacetonate);

[(iPr$_2$Ph)$_2$DABMe$_2$]Ni(CF$_3$OEt-α-Meacac)$_2$-N,N'-bis(2, 6-diisopropylphenyl)-2,3-butanediimine bis(ethyl α-methyl-4,4,4-trifluoroacetoacetato) nickel(II);

[(iPr$_2$Ph)$_2$DABMe$_2$]Ni(CF$_3$furacac)$_2$-N,N'-bis(2,6-diisopropylphenyl)-2,3-butanediimine nickel(II) bis(4, 4,4-trifluoro-1-(2-furyl)acetylacetonate);

[(iPr2Ph)$_2$DABMe$_2$]Ni(CF$_3$CF$_2$CF$_2$tBuacac)$_2$-N,N'-bis (2,6-diisopropylphenyl)-2,3-butanediimine nickel(II)

bis(2,2-dimethyl-6,6,7,7,8,8,8-heptafluoro-3,5-octanedionate)

[(iPr$_2$Ph)$_2$DABAn]Ni(hfacac)$_2$-N,N'-bis(2,6-diisopropylphenyl)acenaphthyl nickel(II) bis (hexafluoroacetylacetonate);

[(Me$_2$Ph)$_2$DABH$_2$]Ni(acac)$_2$-N,N'-bis(2,6-dimethylphenyl)-1,2-ethylenediimine nickel(II) bis (acetylacetonate);

[(iPr$_2$Ph)$_2$DABH$_2$]Ni(hfacac)$_2$-N,N'-bis(2,6-diisopropylphenyl)-1,2-ethylenediimine nickel(II) bis (hexafluoroacetylacetonate);

[(Me$_2$Ph)$_2$DABH$_2$]Ni(hfacac)$_2$-N,N'-bis(2,6-dimethylphenyl)-1,2-ethylenediimine nickel(II) bis (hexafluoroacetylacetonate);

[(Me$_2$Ph)$_2$DABMe$_2$]Ni(acac)$_2$-N,N'-bis(2,6-dimethylphenyl)-2,3-butanediimine nickel(II) bis (acetylacetonate);

and mixtures of two or more thereof.

In general, catalysts systems used for polymerization in the Examples were prepared as described herein.

The Table columns convey the following information. Mass Ni complex (grams) is the mass of [(iPr$_2$Ph)$_2$DABMe$_2$]Ni(hfacac)$_2$ charged to the polymerization reactor for each Run. Mass Support (grams) is the mass of aluminophosphate charged to the reactor for each Run. Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C. High load melt index (HLMI, g/10 mins) was determined in accordance with ASTM D1238 at 190° C. with a 21,600 gram weight. Melt index (MI, g/10 mins) was determined in accordance with ASTM D1238 at 190° C. with a 2,160 gram weight. Values that were not determined are represented as "ND" in the Tables.

Example 1

The following experiments show the effect of added aluminophosphate to the reaction system with 0.5 mL of 2M trimethylaluminum (TMA) in hexanes as the alkylating agent. All experiments were performed at 60° C. in isobutane. No polymer is formed in the absence of the aluminophosphate with trimethylaluminum.

TABLE 1

| Run No. | Mass Ni complex (g) | Mass AlPO$_4$ (g) | Productivity (g PE/g Ni) | MI (g/10 min) | HLMI (g/10 min) | Density (g/cc) |
|---|---|---|---|---|---|---|
| 101 | 0.0167 | 0 | 0 | | | |
| 102 | 0.0045 | 0.47 | 60300 | 0 | 0 | 0.904 |
| 103 | 0.0087 | 0.55 | 38100 | 0 | 0 | 0.901 |
| 104 | 0.0430 | 0.53 | 60000 | 0 | 0 | 0.898 |

Runs 101 is comparative example in which no aluminophosphate, Runs 102–104 are embodiments which included aluminophosphate in the catalyst system. The data in Table 1 show that catalyst systems comprising a diimine nickel(II) complex and trimethyl aluminum (TMA) can effectively polymerize ethylene when aluminophosphate is included in the catalyst system, as in Runs 102–104. In contrast, catalyst systems comprising the same diimine complex and TMA without aluminophosphate were not active as catalysts for olefin polymerization, as in Run 101. Thus, Example 1 shows that the inclusion of aluminophosphate can render an inactive catalyst system comprising an alkyl aluminum cocatalyst active for olefins polymerization.

Example 2

The following experiments show the effect of varying the quantity of alkylating agent on the productivity of the catalyst with added aluminophosphate. The addition of large quantities of alkylating agent appears to decrease catalyst system productivity. Note that Run 201 is the same as Run 102.

TABLE 2

| Run No. | Mass Ni complex (g) | Mass support (g) | Volume TMA (mL) | Productivity (g PE/g Ni) | MI (g/10 min) | HLMI (g/10 min) | Density (g/cc) |
|---|---|---|---|---|---|---|---|
| 201 | 0.0045 | 0.47 | 0.5 | 60300 | 0 | 0 | 0.904 |
| 202 | 0.0430 | 0.50 | 2 | 51400 | 0 | 0 | 0.898 |
| 203 | 0.0400 | 0.50 | 5 | 26600 | 0 | 0 | 0.896 |

Example 3

The following experiments show the effect of added aluminophosphate to the reaction system with two different volumes of 15% weight/weight diethylzinc (DEZ) as the alkylating agent. All experiments were performed at 60° C. in isobutane. No polymer is formed in the absence of the aluminophosphate with diethylzinc. Thus, catalyst systems comprising cocatalysts other than aluminum-based cocatalysts can benefit from the inclusion of aluminophosphate in the catalyst system.

TABLE 3

| Run No. | Mass Ni complex (g) | Mass AlPO$_4$ (g) | Volume DEZ (mL) | Productivity (g PE/g Ni) | MI (g/10 min) | HLMI (g/10 min) | Density (g/cc) |
|---|---|---|---|---|---|---|---|
| 301 | 0.0396 | 0 | 1 | 0 | | | |
| 302 | 0.0430 | 0.55 | 1 | 34500 | 0 | 0 | 0.898 |
| 303 | 0.0428 | 0 | 5 | 0 | | | |
| 304 | 0.0380 | 0.50 | 5 | 27200 | 0 | 0.05 | 0.901 |

Run 301 and 303 are comparative examples in which no aluminophosphate was included in the catalyst system, while Runs 302 and 304 were embodiments which included aluminophosphate in the catalyst system. The data in Table 3 show that catalyst systems comprising a diimine nickel(II) complex and diethyl zinc (DEZ) can effectively polymerize ethylene when aluminophosphate is included in the catalyst system, as in Runs 302 and 304. In contrast, catalyst systems comprising the same diimine nickel complex and DEXZ were not active as catalyst systems for olefin polymerization, as in Runs 301 and 303. Thus, Example 3 shows that the inclusion of aluminophosphate can render an inactive catalyst system comprising an alkyl zinc cocatalyst active for olefin polymerization.

Example 4

The following experiments show the effect of added aluminophosphate to the reaction system with two different volumes of 25.6% weight/weight diethylaluminum chloride (DEAC) as the alkylating agent. All experiments were performed at 60° C. in isobutane. The addition of aluminophosphate causes a slight increase in productivity at low levels of diethylaluminum chloride. Improved catalyst system productivity can be achieved by including aluminophosphate in a catalyst system comprising a diimine nickel complex and an alkyl metal monohalide, such as diethyl aluminum chloride. At higher levels of diethylaluminum chloride, the addition of aluminophosphate causes a more substantial increase in catalyst system productivity.

TABLE 4

| Run No. | Mass Ni complex (g) | Mass AlPO$_4$ (g) | Volume DEAC (mL) | Productivity (g PE/g Ni) | MI (g/10 min) | HLMI (g/10 min) | Density (g/cc) |
|---|---|---|---|---|---|---|---|
| 401 | 0.0385 | 0 | 1 | 11000 | 0 | 0.41 | <0.880 |
| 402 | 0.0430 | 0.50 | 1 | 12200 | 0 | 0.3 | 0.888 |
| 403 | 0.0406 | 0 | 5 | 5300 | 0 | 0.19 | 0.892 |
| 404 | 0.0440 | 0.55 | 5 | 11000 | 0 | 0.35 | 0.880 |

Runs 401 and 403 are comparative examples in which no aluminophosphate was included in the catalyst system while Runs 402 and 404 are embodiments which included aluminophosphate. The data in Table 4 show that catalyst systems comprising a diimine nickel(II) complex and diethyl aluminum chloride are active as olefin polymerization catalysts, but their productivity was improved by the inclusion of aluminophosphate in the catalyst system. Thus, Example 4, again, teaches that the inclusion of aluminophosphate can improve the activity and/or productivity of a catalyst system comprising an alkyl metal monohalide cocatalyst.

Example 5

The following experiments show the effect of added aluminophosphate to the reaction system with 25% weight/weight ethylaluminum dichloride (EADC) as the alkylating agent. All experiments were performed at 60° C. in isobutane. This example shows that the catalytic activity of certain catalyst systems comprising a diimine nickel complex and an alkyl metal dihalide can be altered and improved by including aluminophosphate in the catalyst system. The addition of aluminophosphate causes a drop in productivity at high levels of diethylaluminum chloride.

TABLE 5

| Run No. | Mass Ni complex (g) | Mass AlPO$_4$ (g) | Volume EADC (mL) | Productivity (g PE/g Ni) | MI (g/10 min) | HLMI (g/10 min) | Density (g/cc) |
|---|---|---|---|---|---|---|---|
| 501 | 0.0393 | 0 | 5 | 43200 | 0 | 0.02 | 0.904 |
| 502 | 0.0500 | 0.49 | 5 | 19700 | 0.01 | 0.64 | <0.880 |

Runs 501 and 503 are comparative examples in which no aluminophosphate was included in the catalyst system. The data in Table 5 shows that catalyst systems comprising a diimine nickel(II) complex and ethyl aluminum dichloride are active as olefin polymerization catalysts, and the effect of the inclusion of aluminophosphate in the catalyst system is dependent upon the amount of ethyl aluminum dichloride in the catalyst system. Runs 503 and 504 indicate that the use of a relatively large amount of metal alkyl dichloride relative to the aluminophosphate and/or the diimine nickel complex results in decreased productivity, but also results in lower density of the polymer produced. Similarly, in Runs 403 and 404 in Example 4, the catalyst system that included aluminophosphate also produced polymer having a lower density, however that catalyst system also had improved productivity, as compared to the catalyst system without AlPO$_4$. When a relatively lower amount of metal alkyl dichloride was employed, as in Runs 501 and 502, the inclusion of aluminophosphate in the catalyst system increased the productivity in olefin polymerization, from 32000 grams of polyethylene per gram of nickel complex to 83900 grams of polyethylene per gram of nickel complex.

It has been observed that catalyst systems comprising [(iPr$_2$Ph)$_2$ DABMe$_2$] Ni(hfacac)$_2$ and halogenated cocatalysts, such as DEAC and EADC, as in the Runs in Examples 4 and 5 tended to produce polyethylene having a lower molecular weight, as evidenced by HLMI and having a more highly branched character, as evidenced by density, than did catalyst systems comprising the same nickel complex and non-halogenated cocatalysts, as in Examples 1 and 2. This was observed both in the presence and absence of aluminophosphate in the catalyst system. The effect of cocatalyst on the branching of polymers produced using nickel catalysts has been discussed in the literature, for example, in Pappalardo et al., Macromol. Rapid Commun. 1997, 18, 1017–1023.

Example 6

The following experiments show the effect of added aluminophosphate to the reaction system with two different amounts of 25% weight/weight ethylaluminum dichloride as the alkylating agent. All experiments were performed at 60° C. in isobutane. The addition of large quantities of ethylaluminum dichloride causes a drop in the catalyst's productivity in the presence of the aluminophosphate. Note that Run 602 is the same as Run 502.

TABLE 6

| Run No. | Mass Ni complex (g) | Mass AlPO$_4$ (g) | Volume EADC (mL) | Productivity (g PE/g Ni) | MI (g/10 min) | HLMI (g/10 min) | Density (g/cc) |
|---|---|---|---|---|---|---|---|
| 601 | 0.0375 | 0.56 | 1 | 83854 | 0 | 0.005 | 0.887 |
| 602 | 0.0500 | 0.49 | 5 | 19731 | 0.01 | 0.64 | <0.880 |

Example 7

This example shows that increasing the quantity of ethylaluminum dichloride (25% weight/weight) in the absence of the aluminophosphate does not result in the drop in productivity as seen in the presence of the aluminophosphate. Note that Run 702 is the same as Run 501.

TABLE 7

| Run No. | Mass Ni complex (g) | Volume EADC (mL) | Productivity (g PE/g Ni) | MI (g/10 min) | HLMI (g/10 min) | Density (g/cc) |
|---|---|---|---|---|---|---|
| 701 | 0.0390 | 1 | 32026 | 0 | 0.05 | <0.880 |
| 702 | 0.0393 | 5 | 43223 | 0 | 0.02 | 0.904 |

Example 8

The following experiments show the effect of added aluminophosphate to the reaction system with two different amounts of 25% weight/weight triisopropylaluminum (TIBA) as the alkylating agent. All experiments were performed at 60° C. in isobutane. No polymer is formed at either level of TIBA in the absence of the aluminophosphate.

TABLE 8

| Run No. | Mass Ni complex (g) | Mass AlPO$_4$ (g) | Volume TIBA (mL) | Productivity (g PE/g Ni) | MI | HLMI | Density |
|---|---|---|---|---|---|---|---|
| 801 | 0.0336 | 0.46 | 1 | 49447 | 0 | 0.01 | |
| 802 | 0.0336 | 0.46 | 1 | 49452 | 0 | 0.01 | 0.8959 |
| 803 | 0.0373 | 0 | 1 | 0 | | | |
| 804 | 0.0410 | 0.43 | 5 | 30489 | 0 | 0.009 | 0.8985 |
| 805 | 0.0336 | 0 | 5 | 0 | | | |

While this invention has been described in detail for the purpose of illustration, it is not to be construed as limited thereby but is intended to cover all changes and modifications within the spirit and scope thereof.

That which is claimed is:

1. A process for producing polyolefins comprising contacting at least one olefin in a polymerization zone under polymerization conditions with a catalyst composition produced by combining at least one diimine complex, an aluminophosphate, and at least one cocatalyst selected from the group consisting of alkyl aluminum compounds and alkyl zinc compounds, wherein the diimine complex, aluminophosphate, and cocatalyst are present in such amounts that the catalyst composition is more active than a catalyst composition having the same amounts of the diimine complex and the cocatalyst but no aluminophosphate, and wherein each diimine complex is selected from the group consisting of nickel and palladium diimine complexes having

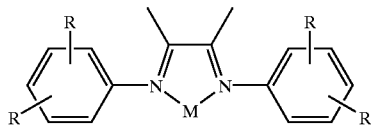

functionality, wherein M is Ni or Pd and each R can be the same or different and is selected from the group consisting of hydrogen and branched or linear alkyl groups or aromatic groups, said alkyl and aromatic groups having 1 to 10 carbon atoms.

2. A process according to claim 1 wherein each diimine complex is selected from nickel diimine complexes.

3. A process according to claim 2 wherein each said cocatalyst is selected from alkyl aluminum halide compounds, trialkyl aluminum halide compounds and dialkyl zinc compounds.

4. A process according to claim 3 wherein each diimine complex is selected from the group consisting of N,N'-bis(2,6-diisopropylphenyl)-2,3-butanediimine nickel(II) bis(acetylacetonate);

N,N'-bis(2,6-diisopropylphenyl)-2,3-butanediimine nickel(II) (1,1,1,5,5,5-hexafluoroacetylacetonate) chloride;

N,N'-bis(2,6-diisopropylphenyl)-2,3-butanediimine bis (allylacetylacetonato) nickel(II);

N,N'-bis(2,6-diisopropylphenyl)-2,3-butanediimine nickel(II) bis(benzoylacetonate);

N,N'-bis(2,6-diisopropylphenyl)-2,3-butanediimine nickel(II) bis(benzoyl-1,1,1-trifluoroacetonate);

N,N'-bis(2,6-diisopropylphenyl)-2,3-butanediimine nickel(II) bis(1,1,1-trifluoroacetylacetonate);

N,N'-bis(2,6-diisopropylphenyl)-2,3-butanediimine nickel(II) bis(1-chloro-1,1-difluoroacetylacetonate);

N,N'-bis(2,6-diisopropylphenyl)-2,3-butanediimine bis (methyltrifluoroacetoacetonato) nickel(II);

N,N'-bis(2,6-diisopropylphenyl)-2,3-butanediimine nickel(II) bis(1,1,1-trifluoro-5,5-dimethylacetylacetonate);

N,N'-bis(2,6-diisopropylphenyl)-2,3-butanediimine bis (ethyl α-methyl-4,4,4-trifluoroacetoacetato) nickel(II);

N,N'-bis(2,6-diisopropylphenyl)-2,3-butanediimine nickel(II) bis(4,4,4-trifluoro-1-(2-furyl) acetylacetonate);

N,N'-bis(2,6-diisopropylphenyl)-2,3-butanediimine nickel(II) bis(2,2-dimethyl-6,6,7,7,8,8,8-heptafluoro-3,5-octanedionate);

N,N'-bis(2,6-diisopropylphenyl)acenaphthyl nickel(II) bis(hexafluoroacetylacetonate);

N,N'-bis(2,6-dimethylphenyl)-1,2-ethylenediimine nickel (II) bis(acetylacetonate);

N,N'-bis(2,6-diisopropylphenyl)-1,2-ethylenediimine nickel(II) bis(hexafluoroacetylacetonate);

N,N'-bis(2,6-dimethylphenyl)-1,2-ethylenediimine nickel (II) bis(hexafluoroacetylacetonate); and N,N'-bis(2,6-dimethylphenyl)-2,3-butanediimine nickel (II) bis(acetylacetonate).

5. A process according to claim 3 wherein N,N'-bis(2,6-diisopropylphenyl)-2,3-butanediimine nickel(II) bis(1,1,1,5,5,5-hexafluoroacetylacetonate) is used in preparing the catalyst composition.

6. A process according to claim 5 wherein only one diimine complex is used in making the catalyst composition.

7. A process according to claim 6 carried out under slurry polymerization conditions.

8. A process according to claim 7 wherein the cocatalyst is selected from trialkyl aluminum compounds and dialkyl zinc compounds.

9. A process according to claim 1 wherein each diimine complex is selected from the group consisting of diimine nickel complexes and diimine palladium complexes comprising additional ligands selected from the group consisting of α-deprotonated-β-diketones, α-deprotonated-β-ketoesters, halogens and mixtures thereof.

10. A process according to claim 2 wherein said cocatalyst is selected from the group consisting of non-halogenated alkyl metal compounds.

11. A process according to claim 2 wherein said cocatalyst is selected from the group consisting of trialkyl aluminum compounds and dialkyl zinc compounds.

12. A process according to claim 2 wherein said process is a slurry polymerization process.

* * * * *